United States Patent Office 2,882,318
Patented Apr. 14, 1959

2,882,318

HYDROXY-METHYLINDANONE OXIMES AND METHOD

Donald G. Kundiger, Manhattan, Kans., and Elwin B. W. Ovist, Park Forest, Ill., assignors to The Dow Chemical Company, Midland, Mich., a corporation of Delaware No Drawing. Application August 6, 1956
Serial No. 602,458

8 Claims. (Cl. 260—566)

This invention is concerned with hydroxy-methylindanone oximes and is particularly directed to novel compounds having the formula

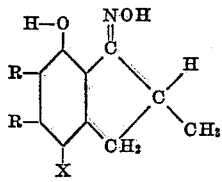

wherein each R represents hydrogen or a methyl radical and X represents chlorine, bromine or an alkyl radical containing 1 to 3 carbon atoms, inclusive, and to a method for preparing such compounds.

The new compounds are crystalline solids, somewhat soluble in polar organic solvents and in aqueous alkali metal hydroxide solutions and of limited solubility in water. They have been found useful as active antimicrobial agents for the control of bacterial and fungal organisms.

In the preparation of the new compounds, a substituted hydroxy-methylindanone of the formula

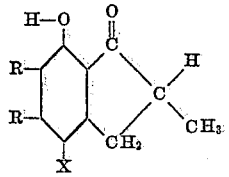

wherein R and X have the aforementioned significance is reacted with a mineral acid salt of hydroxylamine in any suitable fashion. In one mode of operation, following a standard procedure for the preparation of oximes, the hydroxy-methylindanone and a molar excess of hydroxylamine hydrochloride are dissolved together in an aqueous 10 percent alkali metal hydroxide solution. To the resulting solution, ethanol is added and the mixture heated at the boiling temperature under reflux for a period of time. The oxime product is recovered by cooling the reaction mixture to precipitate the oxime followed by conventional separation and purification steps such as filtration and recrystallization. This method has the disadvantages of producing the oxime in an impure state and in low yields.

In an alternative method of preparing the compounds of the invention, the hydroxy-methylindanone is heated with a molar excess of hydroxylamine hydrochloride in a mixture of pyridine and absolute ethanol. The heating is carried out at the boiling point and under reflux for a period of one to several hours. Thereafter the solvents are recovered by distillation and the residue from the distillation recrystallized to obtain the desired product. This method also has the disadvantage of producing the oxime product in relatively low yields and poor purity.

Now, in accordance with the present invention, it has been discovered that the new oxime compounds can be produced in excellent yields and in a high state of purity by a novel method. In such method, a hydroxy-methylindanone is heated with a molar excess of a mineral acid salt of hydroxylamine in a reaction solvent in the presence of an anhydrous alkali metal carbonate.

When operating in accordance with said novel method of preparation, good results are obtained when employing at least about 1.2 moles of hydroxylamine salt per mole of hydroxy-methylindanone and at least 1 mole of alkali metal carbonate per mole of hydroxylamine salt. The reaction is carried out at temperatures of from about 50° to 150° C. and preferably at from 60° to about 110° C. In a convenient mode of operation the reaction mixture is maintained at the boiling point under reflux. On completion of the reaction, the crude product solution is filtered or decanted from insoluble alkali metal salts and the filtrate mixed with an approximately equal volume of water or dilute acid to precipitate the desired oxime.

Suitable reaction solvents are neutral, oxygen-containing aliphatic compounds, inert to the action of hydroxylamine and substantially anhydrous. Such solvents include aliphatic alcohols, ethers and esters, boiling in the reaction temperature range and lower aliphatic alcohols such as methanol, ethanol, propanols or butanols are preferred. The alkali metal carbonate reactant is employed in finely divided form and in substantially anhydrous condition.

The following examples illustrate the invention but are not to be construed as limiting the same:

*Example 1*

40 grams (0.2 mole) of 4-chloro-7-hydroxy-2-methyl-1-indanone and 40 grams (0.57 mole) of hydroxylamine hydrochloride were dissolved in 80 milliliters of aqueous 10 percent sodium hydroxide solution. To the resulting solution, 200 milliliters of ethanol was added and the mixture heated to boiling and maintained under reflux for 2 hours. Thereafter the reaction mixture was cooled to precipitate an impure 4-chloro-7-hydroxy-2-methyl-1-indanone oxime product as a dark-colored mass. The latter was dissolved in a heated mixture of ethanol and water, treated with activated charcoal and recrystallized to obtain 4.4 grams (9 percent of theoretical) of purified 4-chloro-7-hydroxy-2-methyl-1-indanone oxime product, melting at 114°–115° C.

*Example 2*

Thirty grams (0.15 mole) of 4-chloro-7-hydroxy-2-methyl-1-indanone and 30 grams (0.4 mole) of hydroxylamine hydrochloride were dissolved in a mixture of 150 milliliters of pyridine and 150 milliliters of ethanol and the mixture heated at the boiling point and under reflux for a period of ninety minutes. The ethanol and pyridine were then removed by distillation under reduced pressure. The residue from the distillation was recrystallized from an ethanol-water mixture to obtain 12.8 grams (40 percent of theoretical) of somewhat impure 4-chloro-7-hydroxy-2-methyl-1-indanone oxime product, melting from 111° to 114° C.

*Example 3*

Ten grams (0.05 mole) of 4-chloro-7-hydroxy-2-methyl-1-indanone, 10 grams (0.13 mole) of hydroxylamine hydrochloride, 20 grams (0.19 mole) of anhydrous sodium carbonate and 100 milliliters of absolute ethanol were mixed together and heated at the boiling point under reflux for a period of six hours. The reaction mixture was then filtered while hot and the filtrate poured into 100 milliliters of ice water to precipitate the 4-chloro-7- hydroxy-2-methyl-1-indanone oxime product as a crystalline solid, melting at 114°–115° C. The latter was obtained in a yield of 9.1 grams (84 percent of theoretical).

*Example 4*

30 grams (0.16 mole) of 2,4-dimethyl-7-hydroxy-1-indanone, 16.5 grams (0.24 mole) of hydroxylamine hydrochloride, 41.4 grams (0.39 mole) of anhydrous sodium carbonate and 150 milliliters of absolute methanol were mixed together and heated at the boiling temperature under reflux for a period of 10 hours. The reaction mixture was decanted into cold, dilute aqueous hydrochloric acid to precipitate a 2,4-dimethyl-7-hydroxy-1-indanone oxime product as a crystalline solid, melting at 108°–109° C. The latter was obtained in a yield of 69 percent of theoretical.

*Example 5*

77.5 grams (0.38 mole) of 4-chloro-2,6-dimethyl-7-hydroxy-1-indanone, 40 grams (0.57 mole) of hydroxylamine hydrochloride, 60.5 grams (0.57 mole) of anhydrous sodium carbonate and 200 milliliters of absolute methanol were mixed together and heated at the boiling temperature under reflux for five hours. On completion of the heating the hot reaction mixture was filtered and the filtrate poured into ice water to precipitate a 4-chloro-2,6-dimethyl-7-hydroxy-indanone oxime product. The latter was recrystallized from a mixture of ethanol and water to produce a purified oxime product melting at 114.5°–115° C.

*Example 6*

15 grams (0.073 mole) of 7-hydroxy-2,4,5-trimethyl-1-indanone, 15 grams (0.22 mole) of hydroxylamine hydrochloride, 15 milliliters of pyridine and 150 milliliters of absolute ethanol were mixed and heated at the boiling point under reflux for a period of 2.5 hours. Thereafter the pyridine and ethanol were removed by distillation under reduced pressure and the residue poured into 200 milliliters of cold water. The oxime product separated as an oil which solidified on standing. The resulting solid product was recrystallized several times from a mixture of ethanol and water to obtain a crystalline 7-hydroxy-2,4,5-trimethyl-1-indanone oxime product, melting at from 91° to 93° C.

In a similar fashion, 4-bromo-7-hydroxy-2-methyl-1-indanone and hydroxylamine sulfate are dissolved in anhydrous isopropanol and heated in the presence of anhydrous potassium carbonate to produce 4-bromo-7-hydroxy-2-methyl-1-indanone oxime as a crystalline solid, having a molecular weight of 256. In like manner, 4-isopropyl-7-hydroxy-2-methyl-1-indanone is reacted with hydroxylamine hydrochloride to produce 4-isopropyl-7-hydroxy-2-methyl-1-indanone as a crystalline solid, having a molecular weight of about 219.

In representative antimicrobial determinations, the oxime products of above examples were individually dispersed in nutrient agar to prepar series of agar media saturated with respect to one of said oxime products. Separate portions of each of the agar media were inoculated with *Satphylococcus aureus*, *Aspergillus terreus* and *Rhizopus nigricans* organisms. Similar agar media without any oxime product were similarly inoculated to serve as checks. The media were incubated for 24 to 48 hours at temperatures conducive to good growth of the organism concerned. Following the incubation period it was found that the media without any oxime product supported heavy growth of the organisms while on the media containing the hydroxy-methylindanone oxime products growth of the test organisms was completely inhibited.

We claim:

1. Hydroxy-methylindanone oximes having the formula

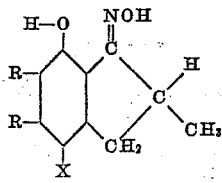

wherein each R is selected from the group consisting of hydrogen and a methyl radical and X is selected from the group consisting of chlorine, bromine, and alkyl radicals containing from 1 to 3 carbon atoms, inclusive.

2. 4-chloro-7-hydroxy-2-methyl-1-indanone oxime.
3. 2,4-dimethyl-7-hydroxy-1-indanone oxime.
4. 4-chloro-2,6-dimethyl-7-hydroxy-1-indanone oxime.
5. 7-hydroxy-2,4,5-trimethyl-1-indanone oxime.
6. A method for the preparation of substituted 7-hydroxy-2-methyl-1-indanone oximes having the formula

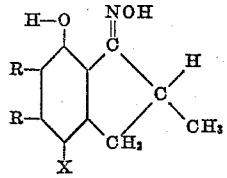

wherein each R is selected from the group consisting of hydrogen and a methyl radical and X is selected from the group consisting of chlorine, bromine and alkyl radicals containing from 1 to 3 carbon atoms, inclusive, which comprises reacting a substituted 7-hydroxy-2-methyl-1-indanone having the formula

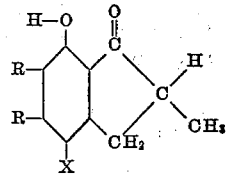

wherein R and X are as above defined with a mineral acid salt of hydroxylamine in a substantially anhydrous, neutral, oxygen-containing reaction solvent and in the presence of an anhydrous alkali metal carbonate in the temperature range of from about 50° to about 150° C.

7. A method according to claim 6 wherein the hydroxylamine salt is employed in the proportion of at least 1.2 moles per mole of indanone reactant and the alkali metal carbonate is employed in the proportion of at least one mole per mole of hydroxylamine salt.

8. A method according to claim 6 wherein the alkali metal carbonate is anhydrous sodium carbonate.

References Cited in the file of this patent

UNITED STATES PATENTS

| 2,237,365 | Schlack | Apr. 8, 1941 |
| 2,270,204 | Schlack | Jan. 13, 1942 |
| 2,462,008 | Snider et al. | Feb. 15, 1949 |

OTHER REFERENCES

Auwers et al.: Ber. Deut. Chem., 44, pp. 3692–9 (1911).
Auwers et al.: Chem. Abst., 17, pp. 382–3 (1923).
Mayer et al.: Ber. Deut. Chem., 61B, p. 1973 (1928).
Frear et al.: J. of Economic Entomology, vol. 40, pp. 736–741.
Noller: "Chemistry of Organic Compounds," 2nd ed., Saunders, Philadelphia (1957), pp. 210, 211.